Sept. 5, 1961 A. L. SHOOK 2,998,669
FISHING RIGS
Filed Aug. 11, 1959
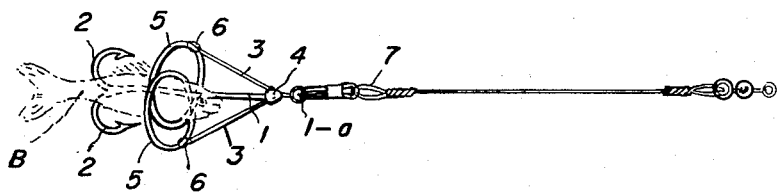
FIG. 1
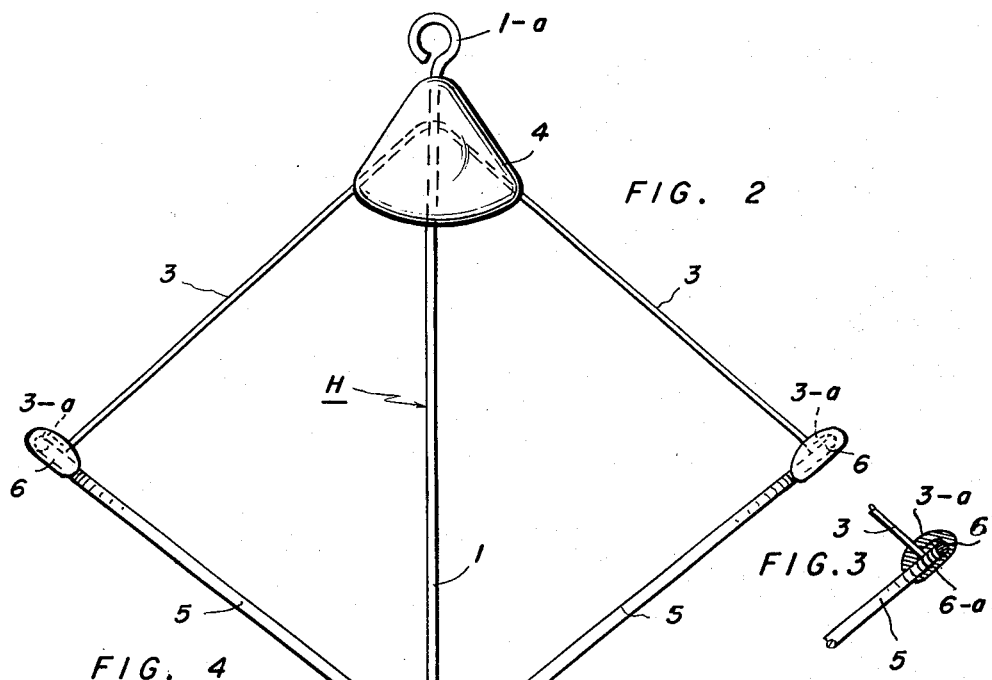
FIG. 2
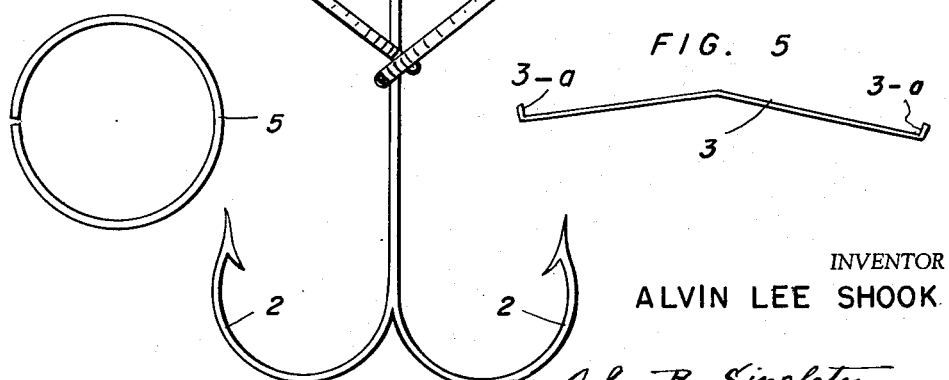
FIG. 3
FIG. 4
FIG. 5
INVENTOR
ALVIN LEE SHOOK
BY Ogle R. Singleton
ATTORNEY

United States Patent Office 2,998,669
Patented Sept. 5, 1961

2,998,669
FISHING RIGS
Alvin Lee Shook, Grayson County, Tex.
(Box 112, Pottsboro, Tex.)
Filed Aug. 11, 1959, Ser. No. 833,049
1 Claim. (Cl. 43—43.4)

My invention consists in a new and useful improvement in fishing rigs and is designed to provide a resilient holder for live or artificial bait immediately adjacent the barb of a fish hook. The device, while firmly holding live bait, will allow bait such as a minnow to breathe. The rig is so constructed as to avoid tangling or snagging of the fish hook in brushy areas or baited beds. The device can be used for casting, trolling, drift-fishing, and still-fishing, with immunity from snagging. It saves hooks, bait, sinkers and peace of mind.

While I illustrate in the drawings and hereinafter fully describe one specific embodiment of my invention, it is to be distinctly understood that I do not consider my invention to be limited to said embodiment but refer for its scope to the claim appended hereto.

In the drawings:

FIG. 1 is a side perspective of the baited rig.

FIG. 2 is a greatly enlarged, top plan of the rig.

FIG. 3 is a detail, partly in section, of a joint of the rig.

FIG. 4 is a top plan of one of the bait rings.

FIG. 5 is a top plan of the spring wire for holding the rings.

As shown in the drawings, my improved rig has a fish hook H comprising a shank 1 and a pair of barbs 2. A spring wire 3 having turned ends 3-a is mounted on the outer portion of the shank 1 by a molded mass of lead 4 to provide a sinker. A pair of wire rings 5, embracing the shank 1, are mounted on the ends 3-a of the wire 3, respectively, by masses of lead 6 having rectilinear faces 6-a parallel with the rings 5. The shank 1 has a ring 1-a at its outer end, for attachment of the line 7.

As shown in FIG. 1, the rings 5 can be manipulated to encircle and yieldingly grasp the live bait B, such as a minnow, or artificial bait.

It will be noted (FIGS. 1 and 2) that the wire 3 is so mounted on the shank 1 of the hook H, by the sinker 4, that it is V-shaped providing diverging arms between the line 7 and the barbs 2. It is this feature of construction of my improved rig by which tangling or snagging of the hook H is avoided.

Having described my invention, what I claim is:

In a fishing rig, the combination of a fish hook having a shank and a pair of barbs disposed on the sides of said shank, respectively, said shank and barbs lying in a common plane; a V-shaped member consisting of a resilient wire fixed on said shank in said plane, and comprising a pair of spring arms diverging from said shank, said member being adapted to prevent tangling or snagging of said barbs; and a pair of circular members embracing said shank and adapted to receive therein a live fish as bait, the outer ends of said spring arms being fixed on the peripheries of said circular members, respectively.

References Cited in the file of this patent
UNITED STATES PATENTS

| | | |
|---|---|---|
| 616,657 | Gaines | Dec. 27, 1898 |
| 1,215,938 | Jay | Feb. 13, 1917 |
| 1,295,370 | Porter | Feb. 24, 1919 |
| 1,464,571 | Hanson | Aug. 14, 1923 |
| 2,402,730 | Bucks | June 24, 1946 |
| 2,582,418 | Crowder | Jan. 15, 1952 |
| 2,741,060 | Rowlance | Apr. 10, 1956 |